United States Patent
Cho et al.

(10) Patent No.: US 9,892,323 B2
(45) Date of Patent: Feb. 13, 2018

(54) AUGMENTED REALITY DEVICE BASED ON RECOGNITION OF SPATIAL STRUCTURE AND METHOD THEREOF

(71) Applicant: ELECTRONICS AND TELECOMMUNICATIONS RESEARCH INSTITUTE, Daejeon (KR)

(72) Inventors: Hyun Woo Cho, Daejeon (KR); Young Woon Lee, Daejeon (KR); Sung Uk Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/185,483

(22) Filed: Jun. 17, 2016

(65) Prior Publication Data
US 2017/0193299 A1    Jul. 6, 2017

(30) Foreign Application Priority Data
Jan. 5, 2016    (KR) ................. 10-2016-0001034

(51) Int. Cl.
    G06K 9/00    (2006.01)
    G06K 9/62    (2006.01)
    G06T 19/00    (2011.01)

(52) U.S. Cl.
    CPC ....... *G06K 9/00671* (2013.01); *G06K 9/6202* (2013.01); *G06T 19/006* (2013.01);
    (Continued)

(58) Field of Classification Search
    CPC ............... G06F 17/30268; G06F 3/011; G06F 17/30247; G06F 3/0304; G06F 3/04815;
    (Continued)

(56) References Cited

U.S. PATENT DOCUMENTS 8,405,680 B1 *    3/2013    Cardoso Lopes ....... G06T 19/00 345/426
9,243,916 B2 *    1/2016    Roumeliotis ........ G01C 21/165
(Continued)

FOREIGN PATENT DOCUMENTS

KR    10-1170490 B1    8/2012
KR    10-2013-0068575 A    6/2013
(Continued)

OTHER PUBLICATIONS

Hyunwoo Cho et al., "Indoor Spatial AR System for Education", ICCCS 2015 The 15th International Conference on Computers, Communications and Systems, pp. 1-3, Nov. 6, 2015.

*Primary Examiner* — Aklilu Woldemariam
(74) *Attorney, Agent, or Firm* — LRK Patent Law Firm (57) ABSTRACT

An augmented reality device based on recognition of a spatial structure includes: a point cloud normal vector extracting unit extracting a normal vector for a point cloud from image data input from a camera; a plane object segmenting unit segmenting a plane in the image data by using the extracted normal vector; a representative plane selecting unit selecting a representative plane among the segmented planes; a spatial structure extracting unit recognizing a spatial structure by using the representative plane; and a virtual object matching unit matching a virtual object in the recognized spatial structure.

15 Claims, 6 Drawing Sheets

(52) U.S. Cl.
CPC ...... *G06K 9/00* (2013.01); *G06T 2207/10012* (2013.01); *G06T 2207/10028* (2013.01); *G06T 2207/30244* (2013.01)

(58) Field of Classification Search
CPC .... G06K 9/00671; G06K 9/46; G06K 9/4671; G06K 9/2036; G06K 9/6269; G06K 9/6271; G06K 9/00624; G06K 9/6202; G06K 9/6255; G06K 9/4604; G06T 11/00; G06T 19/006; G06T 19/20; G06T 2219/2021; G06T 19/00; G06T 2207/10012; G06T 2207/10028; G06T 7/344; G06T 17/10; G06T 7/593; G06T 7/60; G06T 7/75; G06T 15/10; G06T 2207/10024; G06T 2219/2004; G06T 17/00; G06T 2207/30244; G06T 7/251; G06T 7/73; G01J 2003/2826; G01J 3/0208; G01J 3/10; H04N 13/0239; H04N 13/0275; H04N 5/265; H04N 2213/001; H04N 13/0011; H04N 13/0271; H04N 13/0003; H04N 13/0007; H04N 13/004; H04N 13/0203; H04N 13/0246; A61B 2090/364; A61B 90/36; G01S 17/89
USPC .......... 382/154, 190; 345/419, 420; 348/46, 348/222
See application file for complete search history.

(56) References Cited

U.S. PATENT DOCUMENTS

| | | | |
|---|---|---|---|
| 2012/0314096 A1* | 12/2012 | Kruglick | G06T 19/006 348/222.1 |
| 2012/0320053 A1* | 12/2012 | Miyatani | G06T 7/75 345/420 |
| 2013/0004060 A1* | 1/2013 | Bell | G01S 17/89 382/154 |
| 2013/0120365 A1* | 5/2013 | Lee | G06T 19/006 345/419 |
| 2013/0265392 A1* | 10/2013 | Rhee | G06F 3/005 348/46 |
| 2014/0003705 A1* | 1/2014 | Taguchi | G06T 7/344 382/154 |
| 2014/0016821 A1* | 1/2014 | Arth | G06K 9/00671 382/103 |
| 2014/0043329 A1* | 2/2014 | Wang | G06T 17/20 345/420 |
| 2014/0043436 A1* | 2/2014 | Bell | H04N 13/0203 348/46 |
| 2015/0161476 A1* | 6/2015 | Kurz | G06K 9/4671 382/190 |
| 2015/0187139 A1 | 7/2015 | Ahn | |

FOREIGN PATENT DOCUMENTS

| | | |
|---|---|---|
| KR | 10-2014-0094339 A | 7/2014 |
| KR | 10-2014-0145217 A | 12/2014 |

* cited by examiner

AUGMENTED REALITY DEVICE BASED ON RECOGNITION OF SPATIAL STRUCTURE AND METHOD THEREOF

CROSS-REFERENCE TO RELATE APPLICATIONS

This application claims priority to and the benefit of Korean Patent Application No. 10-2016-0001034 filed in the Korean Intellectual Property Office on Jan. 5, 2016, the entire contents of which are incorporated herein by reference.

BACKGROUND OF THE INVENTION

1. Field of the Invention

The present invention relates to an augmented reality device based on a recognition of spatial structure and a method thereof, and more particularly, to a technology that reconfigures a 3D spatial structure based on plane information and provides augmented reality based on the reconfigured spatial structure.

2. Description of Related Art

An augmented reality technology as a technology field derived from a virtual reality technology that creates a virtual space similar to reality or further from the reality by using a computer graphic technology means a technology that synchronizes a reality space and the virtual space and synthesizes a virtual object with the reality to look as if the synthesized virtual object exists in an original reality space.

With the development of a graphic technology, since the virtual space which is more realistic than the reality is created, but an augmented reality technology synthesizes the virtual object on the reality space to duplicatively show the synthesized virtual object unlike the virtual reality technology that makes a sense of difference be felt, the reality space is reinforced with a space which is fit for a purpose of contents by augmenting additional information or the virtual object which is small in sense of difference and cannot be obtained in the reality space.

However, in spite of such an advantage, in the related art, a 3D posture of the space is estimated by using a marker or markerless in order to implement the augmented reality and the technology has a problem in that as recognition is performed by using a pre-learned image feature or when the image feature does not exist in the space, a space to augment the virtual object cannot be specified, and as a result, 3D posture information cannot be obtained, thereby lowering accuracy of the implementation of the augmented reality.

SUMMARY OF THE INVENTION

The present invention has been made in an effort to provide an augmented reality device based on recognition of a spatial structure and a method thereof which provide an augmented reality service based on recognition of an indoor spatial structure to provide an accurate augmented reality service without pre-learning an indoor space.

The technical objects of the present invention are not limited to the aforementioned technical objects, and other technical objects, which are not mentioned above, will be apparently appreciated by a person having ordinary skill in the art from the following description.

An exemplary embodiment of the present invention provides an augmented reality device based on recognition of a spatial structure, including: a point cloud normal vector extracting unit extracting a normal vector for a point cloud from image data input from a camera; a plane object segmenting unit segmenting a plane in the image data by using the extracted normal vector; a representative plane selecting unit selecting a representative plane among the segmented planes; a spatial structure extracting unit recognizing a spatial structure by using the representative plane; and a virtual object matching unit matching a virtual object in the recognized spatial structure.

The plane object segmenting unit may segment the plane for each direction in which the point cloud is crowded by using the normal vector.

The representative plane may include at least one of a bottom plane, a rear wall, and a ceiling.

The representative plane selecting unit may select the representative plane by using a contextual knowledge of the camera and an indoor space configuration.

In the contextual knowledge for selecting the bottom plane among the representative planes, the bottom plane may be positioned on the bottom of the camera and the camera vector may be vertical to normal vectors of the ceiling plane and the bottom plane among the representative planes.

In the contextual knowledge for selecting the rear wall plane among the representative planes, the normal vectors of the bottom plane an the wall plane among the representative planes may be vertical to each other, the normal vectors of the ceiling plane and the wall plane among the representative planes may be vertical to each other, and the rear wall plane may be spaced apart torn the camera by a predetermined interval.

In the contextual knowledge for selecting the ceiling plane among the representative planes, the normal vectors of the ceiling plane and the wall plane may be vertical to each other and the normal vectors of the bottom plane and the ceiling plane among the representative planes may be parallel to each other.

The spatial structure extracting unit may extract a rectangle having a minimum area while including all point clouds of the selected representative plane.

The spatial structure extracting, unit may fit the rectangle to an intersection by acquiring the interaction of the selected representative plane to extract the spatial structure.

The spatial structure extracting unit may match a real object to the extracted spatial structure by using the representative plane and 3D posture information of a real object.

The 3D posture information may include each corner information and normal vectors of the representative plane and the real object.

The virtual object matching unit may match the virtual object in the recognized spatial structure by using the normal vector of the representative plane and internal angle component information of a corner.

The camera may be a depth camera.

Another exemplary embodiment of tire present invention provides an augmented reality method based on recognition of a spatial structure, including: segmenting a plane from input image data; selecting a representative plane among the segmented planes; recognizing a spatial structure by using the representative plane; and matching a virtual object in the recognized spatial structure.

The segmenting of the plane may include extracting a normal vector for a point cloud from the input image data; and segmenting the plane far each direction in which a point cloud is crowded by using the extracted normal vector.

In the selecting of the representative plane, the representative plane may be selected by using a contextual knowledge of a camera and an indoor space configuration.

The recognizing of the spatial structure may include extracting a rectangle having a minimum area while including all point clouds of the selected representative plane, and fitting the rectangle to an intersection by acquiring the interaction of the selected representative plans to extract the spatial structure.

The recognizing at the spatial structure may further include matching a real object with the extracted spatial structure by using the representative plane and 3D posture information of a real object.

In the matching of the virtual object, the virtual object may be matched in the recognized spatial structure by using the normal vector of the representative plane and internal angle component information of a corner.

The representative plane may include at least one of a bottom plane, a rear wall, and a ceiling.

According to exemplary embodiments of the present invention, a 3D space can be recognized without pre-learning a reality space and a virtual object is accurately matched to the recognized 3D space by obtaining 3D posture information to increase accuracy of augmented reality.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 7 is an exemplary diagram illustrating recognition of the spatial structure for the representative plane selected in FIG. 6.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless clearly defined in the present application.

According to the present invention, in a space based augmented reality device using a camera and a display device, a 3D structure of an indoor space is reconfigured based on plant information and 3D posture information is extracted to implement augmented reality, thereby improving accuracy of an augmented reality technology.

Hereinafter, exemplary embodiments of the present invention will be described in detail with inference to FIGS. 1 to 10.

Figure 1:
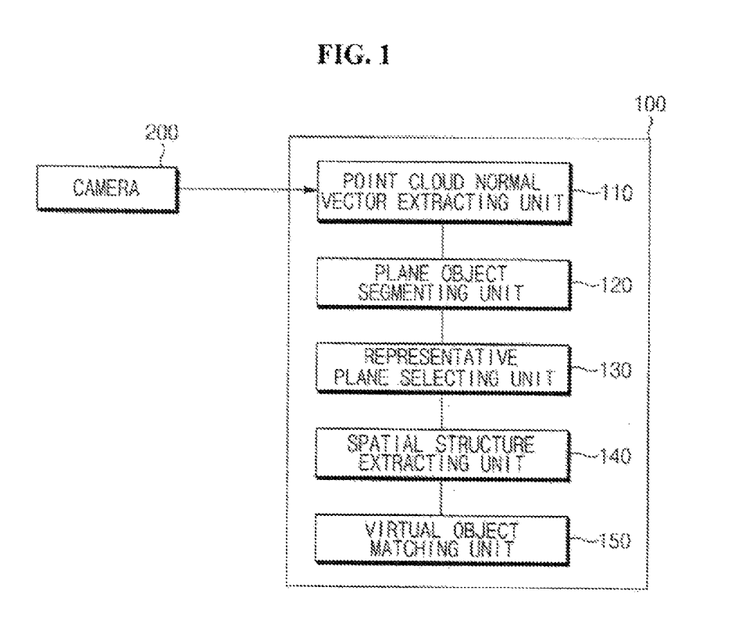
FIG. 1 is a configuration diagram of an augmented reality device using recognition of a spatial structure according to an exemplary embodiment of the present invention.

FIG. 1 is a configuration diagram of an augmented reality device based on recognition of a spatial structure according to an exemplary embodiment of the present invention.

Referring to FIG. 1, the augmented reality device according to the exemplary embodiment of fee present invention may include a point cloud normal vector extracting unit 110, a plane object segmenting unit 120, a representative plane selecting unit 130, a spatial structure extracting unit 140, a virtual object matching unit 150, and a camera 200. In this case, as the camera 200, a depth camera may be provided.

Figure 3:
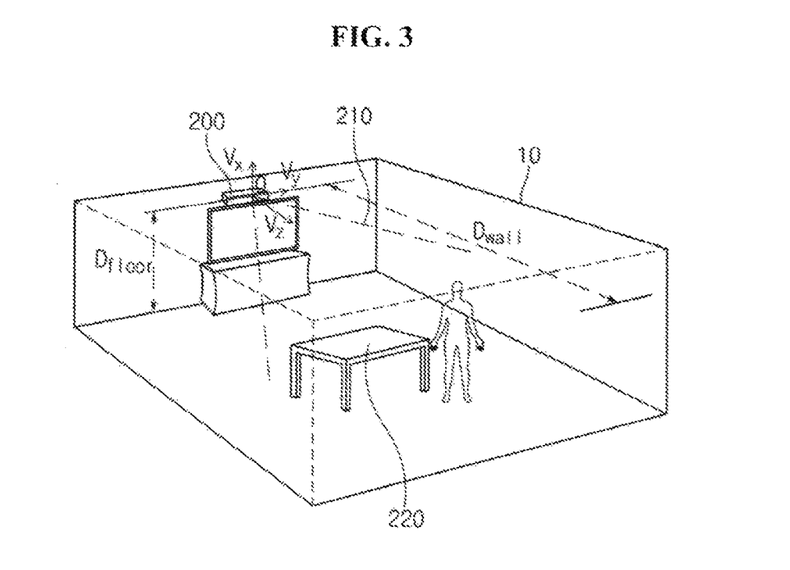
FIG. 3 is a spatial configuration diagram for recognition of an indoor spatial structure by the augmented reality device according to the exemplary embodiment of the present invention.
Figure 4:
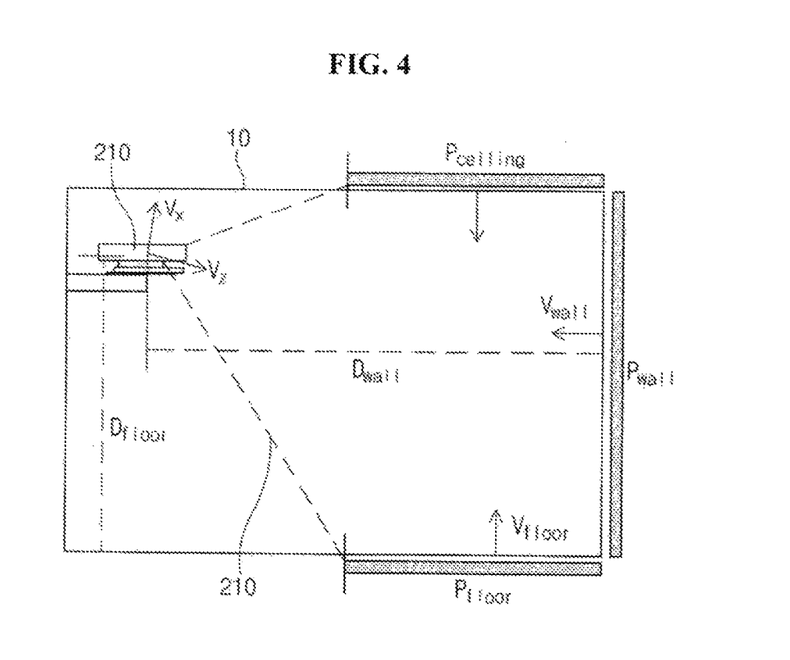
FIG. 4 is a cross-sectional view of a space configuration of FIG. 3 viewed from the side.

The point cloud normal vector extracting unit 110 converts raw data of a depth image input from the camera 200 into 3D point cloud values x, y, and z. Thereafter, the point cloud normal vector extracting unit 110 calculates and stores a normal vector for the converted point cloud. Referring to FIGS. 3 and 4, it can be seen that a point cloud 210 in which the point cloud values are crowded is displayed based on the camera 200. FIG. 3 is a spatial configuration diagram for recognition of an indoor spatial structure by the augmented reality device according to the exemplary embodiment of the present invention and FIG. 4 is a cross-sectional view of a space configuration of FIG. 3 viewed from the side and displays that a normal vector based point cloud 210 is crowded in a spatial structure 10.

Figure 5:
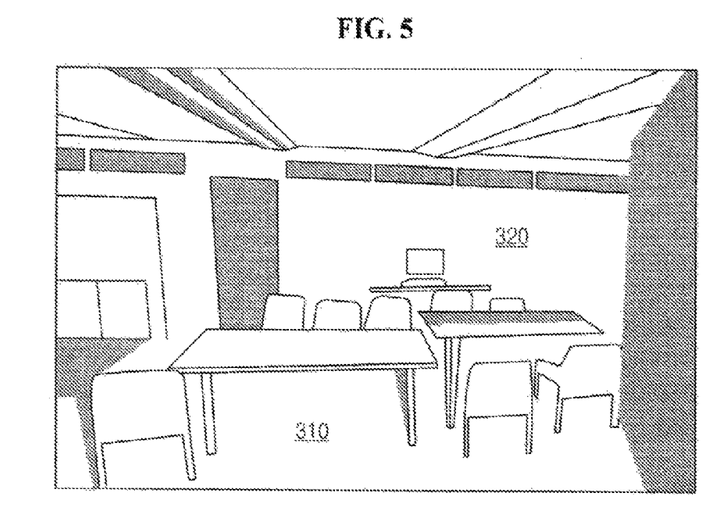
FIG. 5 is an exemplary diagram illustrating plane object segmentation performed by the augmented reality device according to the exemplary embodiment of the present invention.

The plane object segmenting unit 120 segments plane information on an indoor space by using normal vectors Vx, Vy, and Vz calculated by the point cloud normal vector extracting unit 110. In this case, the plane object segmenting unit 110 segments the plane information by using RANdom SAmple Consensus (RANSAC), a region growing segmentation technique that splits an image into small regions and segments the image into regions which finally remain while combining similar regions by calculating a difference in color sense or brightness between adjacent regions, and the like. In this case, the plans object segmenting unit 120 obtains an equation of a plane, a point cloud in the plane, and a center point of the plane through the plane information segmentation. FIG. 5 is an exemplary diagram illustrating plane object segmentation performed by the augmented reality device according to the exemplary embodiment of the present invention.

Referring to FIG. 5, the plane object segmenting unit 120 may classify the plane according to a crowing status of the point cloud for each normal vector and classify the plane into a bottom plane region 310, a real wall plane region 320, and a ceiling region 330. In this case, since the respective regions 310, 320, and 330 of FIG. 5 are not classified into rectangular shapes and the point cloud is not shown at a corner portion, and the like not to be included in the region, and as a result, it may be difficult to accurately recognize the spatial structure. This may be recognized by using the plane equation afterwards.

The representative plane selecting unit 130 performs an operation of selecting the representative plane required for recognizing the spatial structure in the plane information obtained by the plane object segmenting unit 120. In this case, the representative plane may include a bottom, a rear wall, a ceiling, and the like.

The representative plane selecting unit 130 selects the representative plane by using a contextual knowledge of the camera and the indoor space configuration. When the contextual knowledge of the camera and the indoor space configuration is described with reference to FIGS. 3 and 4, the contextual knowledge of the indoor space configuration will be described below.

① A bottom plane is positioned on the bottom of the camera.

② The normal vectors of the bottom and the wall are vertical to each other.

③ The normal vectors of the wall and the ceiling are vertical to each other.

④ The camera vector of FIG. 3 is vertical to the normal vectors of the ceiling and the bottom.

⑤ The rear wall is distant from the camera by 3 m or more.

⑥ The normal vectors of the bottom and the ceiling are parallel to each other.

The representative plane selecting unit 130 primarily classifies the vector of the camera 200 and the normal vector of the plane by comparing the vector of the camera 200 and the normal vector of the plane with a threshold designated by a user in order to find the bottom plane $P_{floor}$. Thereafter, the representative plane selecting unit 130 designates the bottom plane by using the assumptions of ① and ④ described above, designates the real wall $P_{wall}$ by using the assumptions ②, ③, and ⑤, and designates the ceiling $P_{ceiling}$ by using assumptions of ③ and ⑥.

Figure 6:
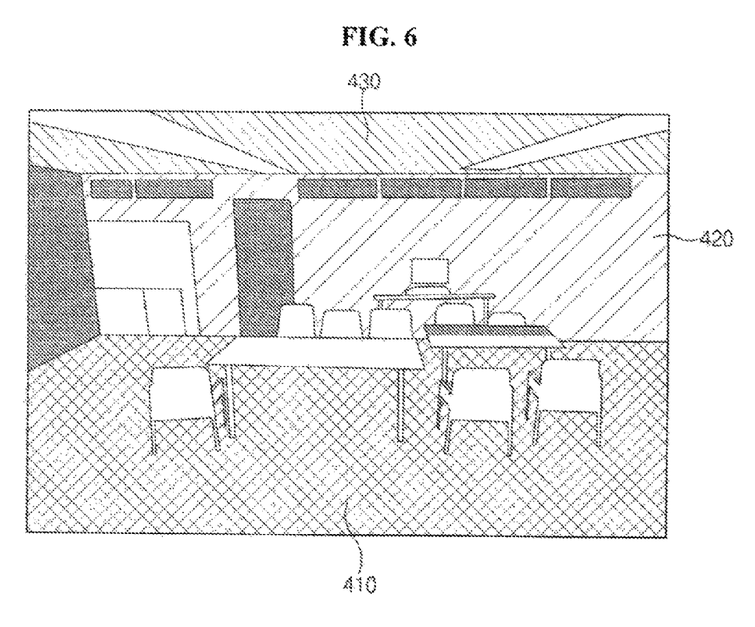
FIG. 6 is an exemplary diagram illustrating selection of a representative plane from segmented planes in FIG. 5.

FIG. 6 is an exemplary diagram illustrating selection of a representative plane from partitioned planes in FIG. 5. Referring to FIG. 6, it can be seen that a bottom plane 410, a rear wall plane 420, and a ceiling plane 430 are selected as the representative plane. However, as illustrated in FIG. 5, the plane object segmenting unit 120 calculates a distance between a point and a plane by using the general plane equation and compares the distance with a threshold with respect to points at a corner region not selected because the crowding of the point cloud is small at the time of segmenting the plane region, and the like to classify the plane region again. That is, the corner region, and the like are also included to the plane region to become a rectangular plane region.

The spatial structure extracting unit 140 extracts a rectangle having a minimum area while including all point clouds of the representative plane selected by the representative plan selecting unit 130. In this case, the spatial structure extracting unit 140 may extract the quadrangle by using a minimum hounding rectangle (MBR) algorithm. FIG. 7 is an exemplary diagram illustrating recognition of the spatial structure for the representative plane selected in FIG. 6. Referring to FIG. 7, the spatial structure extracting unit 140 fits the rectangle obtained from the MBR by acquiring an intersection 600 of each representative plane to intersection information to become an accurate rectangular spatial structure in order to obtain a rectangle closer to a real space. As illustrated in FIG. 7, a bottom plane 610, a rear wall plane 620, and a ceiling plane 630 are configured in the rectangular shape in the rectangular spatial structure.

Figure 8:
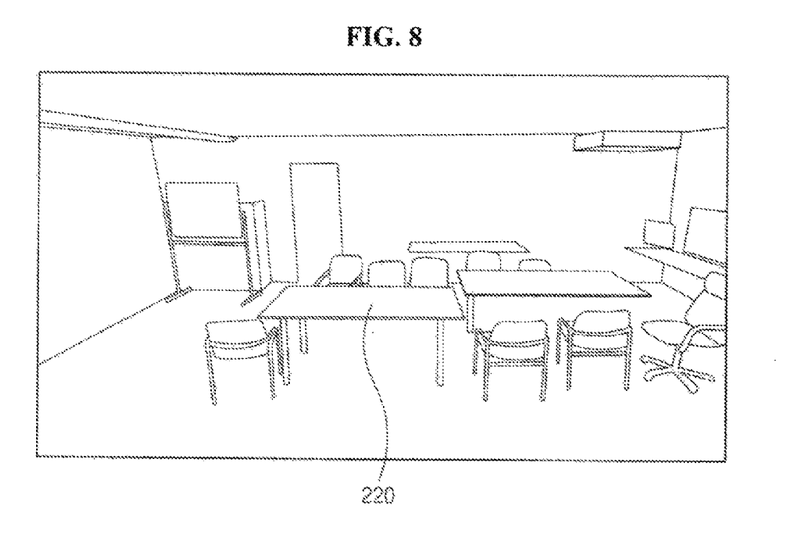
FIG. 8 is an exemplary diagram illustrating matching a real object to the spatial structure recognized in FIG. 7.

Thereafter, the spatial structure extracting unit 140 obtains 3D posture information of objects from the representative plane to match an object 220 in the extracted rectangular spatial structure. FIG. 8 is an exemplary diagram illustrating matching a real object 220 to the spatial structure recognized by the augmented real device according to the exemplary embodiment of the present invention. In this case, the 3D posture information may include the representative plane, point information of corners of the real objects 220, and normal vector information of each representative plane. Therefore, the spatial structure extracting unit 140 matches the real objects by considering posture information of the real objects according to the direction of the representative plane.

Figure 9:
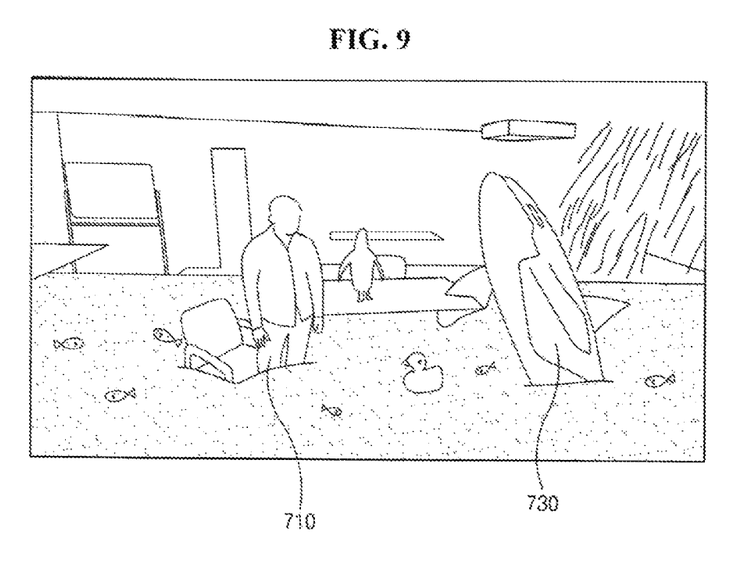
FIG. 9 is an exemplary diagram illustrating matching a virtual object to the spatial structure matched with the real object in FIG. 8.

The virtual object matching unit 150 matches virtual objects 710 and 720 by using the normal vector of the representative plane and internal angle component information of each corner of the representative plane. FIG. 9 is an exemplary diagram illustrating matching virtual objects 710 and 720 to the spatial structure recognized by the augmented real device according to the exemplary embodiment of the present invention.

Figure 2:
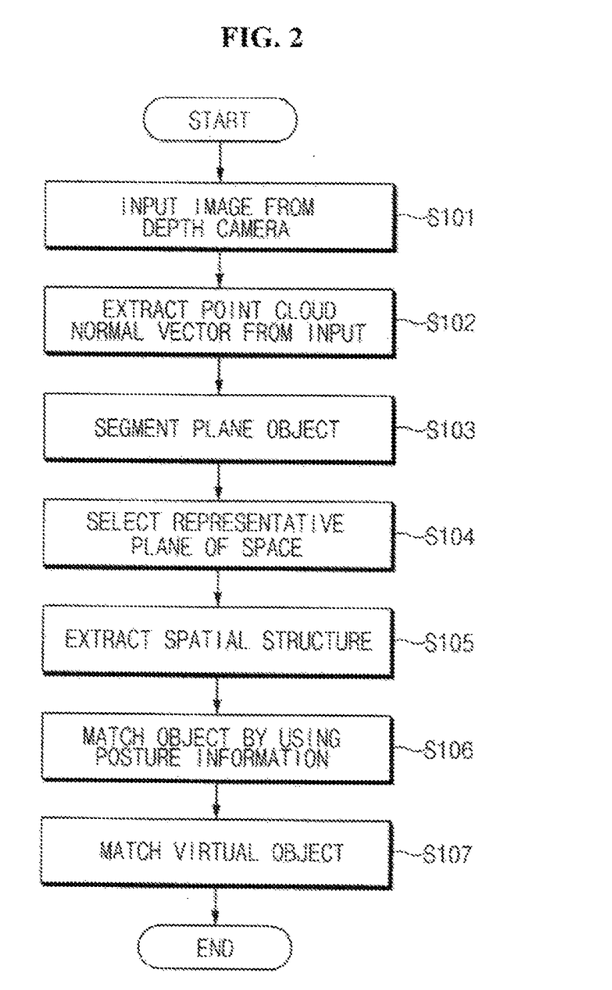
FIG. 2 is a flowchart illustrating an augmented reality method based on spatial recognition of an augmented reality device according to an exemplary embodiment of the present invention.

Hereinafter, a method for providing augmented reality based on spatial recognition of the augmented reality device according to an exemplary embodiment of the present invention will be described in detail with reference to FIG. 2.

When an image is input from the depth camera 200 (S101), the point cloud normal vector extracting unit 110 converts raw data of a depth image input from the depth camera 200 into 3D point cloud values x, y, and z to extract the normal vectors Vx, Vy, and Vz for the point cloud as illustrated in FIGS. 3 and 4 (S102).

Thereafter, the plane object segmenting unit 120 segments the plane information on the indoor space as illustrated in FIG. 5 by using the normal vectors calculated by the point cloud normal vector extracting unit 110 (S103).

Subsequently, the representative plane selecting unit 130 selects the representative plane by using the contextual knowledge of the camera 200 and the indoor space configuration from the plane information obtained by the plane object segmenting unit 120 (S104). Referring to FIG. 6, the representative plane may become the bottom plane 410, the rear wall plane 420, and the ceiling plane 420.

Thereafter, the spatial structure extracting unit 140 extracts the quadrangle which is the spatial structure having a minimum area while including all point clouds of the representative plane selected by the representative plan selecting unit 130 (S105). In this case, the spatial structure extracting unit 140 may extract the accurate spatial structure by using the minimum bounding rectangle (MBR) algorithm and obtaining the intersection of the respective planes. Referring to FIG. 7, it can be seen that the respective planes 610, 620, and 630 have an accurate rectangular structure by the intersection 600.

Subsequently, the spatial structure extracting unit 140 matches the real object 220 in the spatial structure recognized through the representative plane as illustrated in FIG. 8 by using the 3D posture information including corner information and normal vector information of the representative plane and the real objects (S106).

Thereafter, the virtual object matching unit 150 matches the virtual object to the spatial structure matched by the real object 220 as illustrated in FIG. 9 (S107). In this case, the virtual object matching unit 150 may match the virtual object by using the normal vector of the representative plane and internal angle component information of the rectangular corner.

Figure 10:
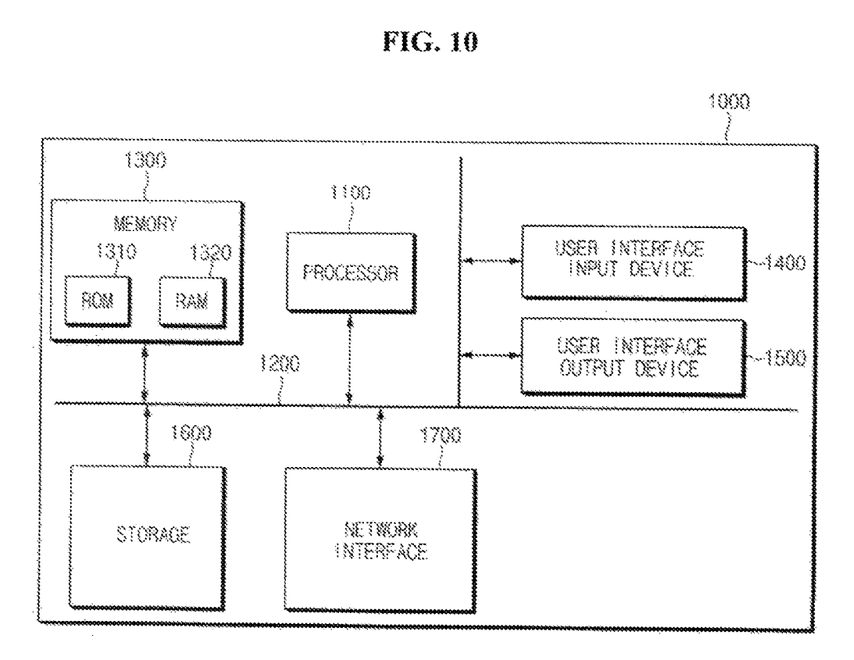
FIG. 10 is a configuration diagram of a computer system to which an augmented reality device is applied according to an exemplary embodiment of the present invention.

FIG. 10 is a configuration diagram of a computer system to which an augmented reality device is applied according to an exemplary embodiment of the present invention.

Referring to FIG. 10 a computing system 1000 may include at least one processor 1100, one memory 1300, one user interface input device 1400, one user interface output device 1500, one storage 1600, and one network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a user terminal. As another method, the processor and the storage medium may reside in the user terminal as individual components.

The above description just illustrates the technical spirit of the present invention and various modifications and transformations can be made by those skilled in the art without departing from an essential characteristic of the present invention.

Accordingly, the exemplary embodiments disclosed herein are intended to not limit but describe the technical spirit of the present invention but the scope of the technical spirit of the present invention is not limited by the exemplary embodiments. The scope of the present invention should be interpreted by the appended claims and all technical spirit in the equivalent range thereto should be interpreted to be embraced by the claims of the present invention.

What is claimed is:

1. An augmented reality device based on recognition of a spatial structure, the augmented reality device comprising:
a memory for storing one or more computer-executable units which are executed by a processor, wherein the one or more executable units comprising:
a point cloud normal vector extracting unit extracting a normal vector for a point cloud from image data input from a camera;
a plane object segmenting unit segmenting a plane in the image data by using the extracted normal vector;
a representative plane selecting unit selecting a representative plane among the segmented planes, wherein the representative plane includes a bottom plane, a rear wall, and a ceiling plane, wherein the representative plane selecting unit selects the representative plane by using a contextual knowledge of the camera and an indoor space configuration, wherein in the contextual knowledge for selecting the rear wall plane among the representative planes, the normal vector of the bottom plane and the wall plane among the representative planes are vertical to each other, the normal vector of the ceiling plane and the wall plane among the representative planes are vertical to each other, and the rear wall plane is spaced apart from the camera by a predetermined interval;
a spatial structure extracting unit recognizing a spatial structure by using the representative plane; and
a virtual object matching unit matching a virtual object in the recognized spatial structure.

2. The augmented reality device of claim 1, wherein the plane object segmenting unit segments the plane for each direction in which the point cloud is crowded by using the normal vector.

3. The augmented reality device of claim 1, wherein in the contextual knowledge for selecting the bottom plane among the representative planes, the bottom plane is positioned on the bottom of the camera and the camera vector is vertical to normal vectors of the ceiling plane and the bottom plane among the representative planes.

4. The augmented reality device of claim 1, wherein in the contextual knowledge for selecting the ceiling plane among the representative planes, the normal vectors of the ceiling plane and the wall plane are vertical to each other and the normal vectors of the bottom plane and the ceiling plane among the representative planes are parallel to each other.

5. The augmented reality device of claim 1, wherein the spatial structure extracting unit extracts a rectangle having a minimum area while including all point clouds of the selected representative plane.

6. The augmented reality device of claim 5, wherein the spatial structure extracting unit fits the rectangle to an intersection by acquiring the interaction of the selected representative plane to extract the spatial structure.

7. The augmented reality device of claim 6, wherein the spatial structure extracting unit matches a real object to the extracted spatial structure by using the representative plane and 3D posture information of a real object.

8. The augmented reality device of claim 7, wherein the 3D posture information includes each corner information and normal vectors of the representative plane and the real object.

9. The augmented reality device of claim 1, wherein the virtual object matching unit matches the virtual object in the recognized spatial structure by using the normal vector of the representative plane and internal angle component information of a corner.

10. The augmented reality device of claim 1, wherein the camera is a depth camera.

11. An computer-implemented augmented reality method based on recognition of a spatial structure, the augmented reality method comprising:
- segmenting a plane from input image data;
- extracting a normal vector for a point cloud from image data input from a camera;
- selecting a representative plane among the segmented planes, wherein the representative plane includes a bottom plane, a rear wall, and a ceiling, wherein selecting the representative plane comprises using a contextual knowledge of the camera and an indoor space configuration, wherein in the contextual knowledge for selecting the rear wall plane among the representative planes, the normal vector of the bottom plane and the wall plane among the representative planes are vertical to each other, the normal vector of the ceiling plane and the wall plane among the representative planes are vertical to each other, and the rear wall plane is spaced apart from the camera by a predetermined interval;
- recognizing a spatial structure by using the representative plane; and
- matching a virtual object in the recognized spatial structure.

12. The computer-implemented augmented reality method of claim 11, wherein:
the segmenting of the plane includes
extracting a normal vector for a point cloud from the input image data; and
segmenting the plane for each direction in which a point cloud is crowded by using the extracted normal vector.

13. The computer-implemented augmented reality method of claim 11, wherein the recognizing of the spatial structure includes
extracting a rectangle having a minimum area while including all point clouds of the selected representative plane, and
fitting the rectangle to an intersection by acquiring the interaction of the selected representative plane to extract the spatial structure.

14. The computer-implemented augmented reality method of claim 13, wherein the recognizing of the spatial structure further includes matching a real object with the extracted spatial structure by using the representative plane and 3D posture information of a real object.

15. The computer-implemented augmented reality method of claim 13, wherein in the matching of the virtual object, the virtual object is matched in the recognized spatial structure by using the normal vector of the representative plane and internal angle component information of a corner.

* * * * *